United States Patent [19]

Arlt

[11] 3,917,631
[45] Nov. 4, 1975

[54] PROCESS FOR PREPARING SUBSTITUTED OXAZOLINES

[75] Inventor: Dieter Arlt, Cologne, Germany

[73] Assignee: Bayer Aktiengesellschaft, Leverkusen, Germany

[22] Filed: Oct. 31, 1972

[21] Appl. No.: 302,438

[30] Foreign Application Priority Data
Nov. 9, 1971 Germany............................ 2155492

[52] U.S. Cl. ............................................. 260/307 F
[51] Int. Cl.² ..................................... C07D 263/10
[58] Field of Search................................. 260/307 F

[56] References Cited
UNITED STATES PATENTS
2,114,326  4/1938  Adams et al. ......................... 260/44
2,714,082  7/1955  Davies et al. ......................... 167/33

FOREIGN PATENTS OR APPLICATIONS
955,951  7/1956  Germany

Primary Examiner—Raymond V. Rush
Attorney, Agent, or Firm—Burgess, Dinklage & Sprung

[57] ABSTRACT

2-Substituted Δ²-oxazoline unsubstituted in the 4- and 5-positions are prepared by reacting N-(2-hydroxyethyl)-carboxylic acid amides having the formula

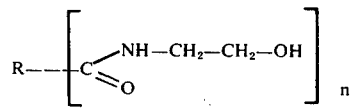

wherein
$n$ is 1, 2 or 3;
R is
  a. an optionally substituted aliphatic, cycloaliphatic, araliphatic or aromatic radical,
  b. the group $R^1—X—R^2—$, or
  c. the group

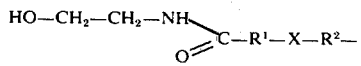

wherein
X is a single bond, the carbonyl group, the imino group (—NH—), or a hetero atom, and
$R^1$ and $R^2$ independently of one another have the meaning given for R under (a), or is a single bond where $n$ is 2,
with at least 75% by weight sulfuric acid at temperatures of from about 20°C to 180°C, followed by neutralization.

7 Claims, No Drawings

PROCESS FOR PREPARING SUBSTITUTED OXAZOLINES

BACKGROUND

This invention relates to a process for the production of 2-substituted Δ²-oxazolines.

There are a number of methods for synthesising Δ²-oxazolines, most of which start with N-(2-hydroxyethyl)carboxylic acid amides wherein the hydroxyl group forms the ring with the carboxylamide group through the elimination of water. Unfortunately, thermal dehydration was only successful in the case of 2-hydroxyethylamides of lower aliphatic carboxylic acids, and even then only using high temperature and resulting in poor yields. The hydroxyethylamides of aromatic carboxylic acids decompose under the reaction conditions (Am. Soc. 57,1079,1080 (1935). Accordingly, in conventional processes, the hydroxyl group is substituted by an acid radical in a first step followed optionally using a one-vessel process, by a second step comprising ring closure with at least an equimolar quantity of a base through elimination of the acid radical. In either case, therefore, it is necessary to use both an aggressive auxiliary substance which is frequently toxic and an equimolar quantity of a base. Examples of the auxiliary substances used include thionyl chloride (cf. JACS 59,2252 to 2258 (1937), tosyl chloride (cf. JACS 75, 5896 (1953), phosgene (cf. JACS 78, 4962(1956) or phosphoric acid ester chlorides (cf. JACS 85, 3258 (1963).

Recently, however, the dehydration step has also been carried out in the gaseous phase at high temperatures in the presence of an aluminum oxide catalyst (Agnew. Chem. 78, 914,915). Unfortunately, the yields are only satisfactory where the 2-hydroxyethylamides of lower aliphatic carboxylic acids are used and even then the conversions only reach at most 80%. Also, the process requires a special production plant and is not generally applicable. In particular, the process cannot be used for synthesising multiple Δ²-oxazolinyl-2substituted compounds.

SUMMARY

Surprisingly, we have now found that 2-substituted Δ²-oxazolines which are not substituted in the 4- and 5-position, can be obtained by reacting N-(2-hydroxyethyl)carboxylic acid amides corresponding to the general formula (I):

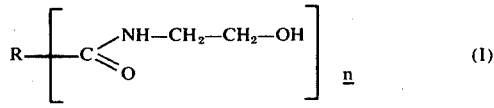

in which
$n$ represents the integers 1, 2 or 3,
R represents
  a. an optionally substituted aliphatic, cycloaliphatic, araliphatic or aromatic radical, or
  b. the group $R^1—X—R^2—$ or
  c. the group

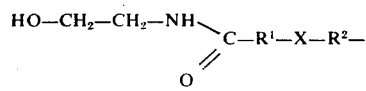

in which
  X represents a single bond, the carbonyl group, the imino group (—NH—) or a hetero atom, and
  $R^1$ and $R^2$ independently of one another have the meaning given for R under (a), or
  d. a single bond where $n = 2$,
with at least 75% by weight sulphuric acid at a temperature in the range of from 20°C to 180°C, followed by neutralisation.

DESCRIPTION

The process which involves dehydration and cyclisation is preferably carried out at a temperature in the range of from 50°C to 150°C, more particularly at temperatures of from 70°C to 120°C. // Optionally substituted linear or optionally branched alkyl radicals having from 1 to 21, preferably 1 to 12 and more particularly with 1 to 6, carbon atoms, are mentioned as examples of aliphatic radicals represented by R. The following are mentioned as specific examples: the methyl-, ethyl-, propyl- and isopropyl-, butyl-, tert.-butyl-, amyl-, hexyl-, dodecyl- and tetradecyl radical.

Cycloaliphatic radicals represented by R are those having from 5 to 10, more particularly 5 and 6 carbon atoms, for example the cyclopentyl and cyclohexyl radical which may optionally also be substituted.

Araliphatic radicals represented by R are those having from 7 to 25 carbon atoms, preferably 1 to 4 carbon atoms, in the chain and with the phenyl or naphthyl radical as the aromatic portion, having 6 to 10 carbon atoms in the ring system.

Aromatic radicals represented by R are those with up to 24, more particularly up to 14 carbon atoms, for example the phenyl-, naphthyl-, anthranyl- and phenanthrene radical, but more particularly the phenyl radical which may optionally also be substituted.

The following are mentioned as examples of substituents of the aliphatic and cycloaliphatic radicals represented by R: halogen, preferably chlorine or bromine, lower alkoxy radicals having from 1 to 8, preferably 1 to 4 carbon atoms, lower alkylcarbonyl radicals having from 1 to 8, preferably 1 to 4, carbon atoms, for example the acetyl-, propionyl- or butyryl radical, and the radical NHR' where R' represents hydrogen, an alkyl radical having from 1 to 18, preferably 1 to 6, carbon atoms, or an aryl radical, preferably the phenyl radical.

The following are mentioned as examples of substituents on the araliphatic and aromatic radical represented by R: halogen (fluorine, chlorine, bromine and iodine), in particular chlorine and bromine, the hydroxy group, the nitro group, alkyl-, alkoxy-, alkylcarbonyl- and alkylcarboxyl radicals each having from 1 to 8, more particularly having 1 to 4, carbon atoms, in the alkyl portion, and the radical NHR' where R' represents hydrogen, an alkyl radical having from 1 to 18, preferably 1 to 6, carbon atoms or an aryl radical, preferably the phenyl radical.

Naturally, the aforementioned examples of the optionally substituted radicals R also apply as regards the optionally substituted double-bond radicals —R— with the proviso that on any one carbon atoms of the radical R an H-atom is substituted by a single bond.

Preferred hetero atoms are oxygen and sulphur.

In general, highly concentrated sulphuric acid is used for the process according to the invention. In the context of the invention, highly concentrated is understood to be a concentration within the range of from 75% by weight sulphuric acid (with the rest water) and 65% oleum (35% by weight $H_2SO_4$, 65% by weight of $SO_3$), preferably within the range from 85% by weight $H_2SO_4$ (with the rest water) and 40% oleum (40% by weight of $SO_3$, 60 % by weight of $H_2SO^4$).

The quantity in which the concentrated sulphuric acid is used is generally selected at least in such a way that the mixture of sulphuric acid and the hydroxyethyl carboxylic acid amide used as starting material can still be stirred at the reaction temperature, although the sum of the equivalents of $H_2SO_4$ and $SO_3$ must at least be equal to the number of equivalents of hydroxyethylcarbonamide.

In general, the sulphuric acid is initially introduced and the 2-hydroxyethyl carboxylic acid amide is added thereto in solid or liquid form. However, it is also possible simultaneously to introduce equivalent quantities of the amide and sulphuric acid into a reaction vessel maintained at the desired reaction temperature. This alternative is preferred for continuous production. On completion of the cyclising reaction, the acid reaction mixture is neutralised with aqueous solutions or suspensions or emulsions of bases. The quantity in which the base is used is such that it is at least equivalent to the concentrated sulphuric acid used. Although an excess of the base is harmless, it is unnecessary.

In general, neutralisation is carried out with cooling at a temperature of from 5°C to 100°C, preferably at a temperature of from 10°C to 80°C.

The following are examples of bases suitable for neutralisation: basically reacting inorganic compounds such as the hydroxides and oxides of the alkali and alkaline earth metals, such as sodium, potassium, calcium and magneisum, the carbonates and bicarbonates of these metals, ammonia and amines for example methylamine, dimethylamine, triethylamine and dimethylaniline. It is preferred to use sodium, potassium and calcium hydroxide, the carbonates and bicarbonates of these metals, calcium oxide and ammonia, and it is particularly preferred to use the hydroxides and carbonates sodium and potassium and ammonia.

The oxazoline, as end product of the reaction, is precipitated from the reaction mixture either in solid or in liquid form and is isolated by methods known per se either continuously or in batches. Any conventional methods for separating solid and liquid substances from the mixture with a liquid can be used, for example filtration, centrifuging and extraction. Organic solvents are preferably used for the extraction; such a solvent can actually be added to the aqueous reaction mixture during its neutralisation with the base. Preferred solvents are hydrocarbons, especially those with a boiling point of at least 80°C, for example benzene or toluene. Other suitable solvents are for example chlorinated hydrocarbons, such as methylene chloride or chlorobenzene, or alcohols immiscible with water, such as n-butanol.

The production process is illustrated by the following formula scheme with reference to the sample of 2-phenyl $\Delta^2$-oxazoline:

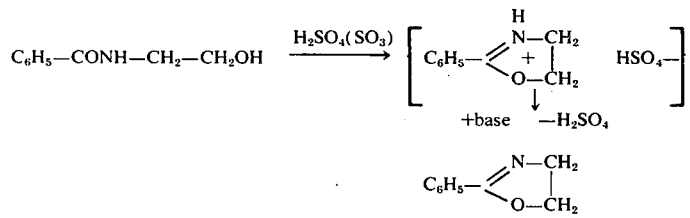

The N-(2-hydroxyethyl)-amides of the following acids are examples of starting materials suitable for the process according to the invention: propionic acid, 3-chloropropionic acid, ω-aminocaproic acid, stearic acid, cyclohexanocarboxylic acid, phenylacetic acid, benzoic acid, o-, m-, p-toluic acid, o-, m-, p-ethylbenzoic acid, o-, m-, p-isopropylbenzoic acid, o-, m-, p-hydroxybenzoic acid, o-, m-, p-aminobenzoic acid, adipic acid, suberic acid, sebacic acid, ω,ω'-dodecanodicarboxylic acid, phthalic acid, isophthalic acid, chloroisophthalic acid, terephthalic acid, trimellitic acid and 3-methylisophthalic acid, 4-tert. butylbenzoic acid.

The fact that the process according to the invention is workable is all the more surprising insofar as it is known that $\Delta^2$-oxazolines readily hydrolyse (cf. Angew. Chem. 78, 917 (1966)) and sulphuric acid is known as a catalyst for their polymerisation through ring-opening, polymerisation actually taking place at room temperature with an adequate quantity of catalyst (loc. cit. page 919). Nevertheless, some ring-closing reactions to form $\Delta^2$-oxazoline are already known, but not for compounds which are not substituted in the hydroxyethyl group.

On the contrary, it has already been emphasized (Am. Soc. 59, 2253 (1937), R. C. Elderfield, Heterocyclic Compounds, Vol. 5, 379, Wiley, New York (1957), that ring closure with sulphuric acid is only possible in cases where the carbon atom carrying the hydroxyl group is tertiary carbon atom. In consistency with this, it is reported that dehydration is much easier when one of the two carbon atoms of the hydroxyethyl group is disubstituted (Angew. Chem. 78, 914 (1966).

It must be regarded as particularly surprising that it is possible by the process according to the invention also to produce in good yields compounds containing several $\Delta^2$-oxazoline rings in the molecule which could be prepared by the conventional process only with poor yields and hence was an unsolved problem on a commercial scale.

Another surprising advantage of the process according to the invention is that the action of highly concentrated sulphuric acid and, more particularly, of oleum on the hydroxyethylamides of aromatic carboxylic acids does not result in undesirable sulphonations in the aromatic nucleus and consequently in considerable reductions in yield.

The Δ²-oxazolines which can be obtained by the process according to the invention correspond to the general formula (II):

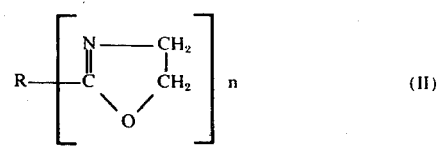

in which

R and n are previously defined except that R may represent the group

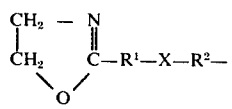

instead of the group

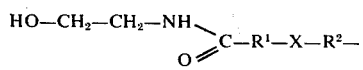

The process according to the invention can preferably be used for the production of bis- and tris-oxazolines corresponding to the general formula (III):

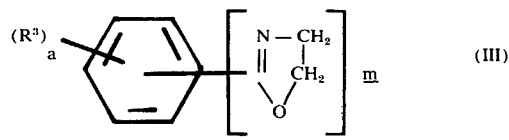

in which

R³ represents an alkyl or aryl radical, halogen, preferably chlorine or bromine, or an alkoxy radical, m represents the integers 2 or 3; and a represents 0, 1, 2 or 3; wherein a = 2 or 3, the radicals R³ do not need to have the same meanings.

R³ preferably represents hydrogen or an alkyl radical having with 1 to 4 C-atoms.

The following are examples of the Δ²-oxazolines which can be obtained by the process according to the invention: 2-propyl-Δ²-oxazoline, 2(3-chloropropyl)-Δ²-oxazoline, 2-(ω-aminopentamethylene)-Δ²-oxazoline, 2-octadecyl-Δ²-oxazoline, 2-cyclohexyl-Δ²-oxazoline, 2-benzyl-Δ²-oxazoline, 2-phenyl-Δ²-oxazoline, 2-(4-nitrophenyl)-Δ²oxazoline, 2-(2,5dichlorophenyl)Δ²-oxazoline, 2-(3-methylphenyl)-Δ²-oxazoline, 2-(4-methoxyphenyl)-Δ²-oxazoline, 2-(2-aminophenyl)-Δ²oxazoline, 2-(3-aminophenyl)-Δ²-oxazoline, 2-(4-aminophenyl)-Δ²-oxazoline, 2-(2-hydroxphenyl)Δ²-oxazoline, 2-(naphthyl-1)-Δ²-oxazoline, 2-(4-methylphenyl-Δ²-oxazoline, 1,2-bis-)Δ²-oxazolinyl-2)-ethane, 1,4-bis-(Δ²-oxazolinyl-2 )butane, 1,8-bis-(Δ²-oxazolinyl-2)-octane, 1,8- and 1,9-bis(Δ²-oxazolinyl-2)-heptadecane, 1,12-bis(Δ²-oxazolinyl-2)dodecane, 1,4-bis-(Δ²-oxazolinyl-2 )-cyclohexane, 1,2-, 1,3- and 1,4-bis-(Δ²-oxazolinyl-2)-benzene, 1,3-bis-(Δ²-oxazolinyl-2)-4-chlorobenzene, 1,2,4-tris-(Δ²-oxazolinyl-2)-benzene, 1-methyl-2,4-bis-(Δ²-oxazolinyl-2)-benzene.

The oxazolines which can be obtained by the process according to the invention are valuable starting compounds for the production of plastics and serve as crosslinkers for polymers containing anhydride or carboxyl groups (DAS No. 1,050,540, Belgian Pat. No. 764,473 and our DOS 2 144 643.

In the following Examples, percentages are percent by weight whilst temperatures are given in degrees centigrade unless otherwise stated.

EXAMPLE 1

500 g of terephthalic acid-bis-N-(2-hydroxyethyl)-amide were dissolved at 100°C in 1300 g of 96% sulphuric acid (4% water content). The solution was maintained for 2 hours at 100°C. Thereafter, the solution was introduced with cooling at 25°-35°C into a cooled mixture of 2500 ml. of a saturated aqueous ammonia solution and 2000 ml. of water. The product which precipitated was filtered under suction and washed with water until the filtrate was neutral. After drying at 100°C in a vacuum drying cabinet, pure 1,4-bis(Δ²-oxazolinyl-2)-benzene was obtained in a yield of 315 g (73.5% of the theoretical yield), melting point 247°C.

EXAMPLE 2

5 kg. of terephthalic acid-bis-N-(2-hydroxyethyl)-amide were introduced with gentle cooling at 30°C to 70°C into 10.5 kg of 30% oleum (30% of SO₃, 70% of H₂SO₄) and the resulting solution was heated for 2 hours to 100°C. This solution was then introduced with stirring and cooling into a solution of 10 kg of sodium hydroxide in 50 liters of water, the mixture being kept at a temperature of 30°–40°C. After the addition, the mixture was heated to 70°C and then filtered. The bis-oxazoline was washed neutral with water and dried as in Example 1. 1,4-bis-(Δ²-oxazolinyl-2)-benzene was obtained in a yield of 3.94 kg (92% of the theoretical yield), melting point 247°C.

EXAMPLE 3

50 g of terephthalic acid-bis-N-(2-hydroxyethyl)-amide were dissolved at 60°C in 147 g of 85% sulphuric acid (15% water content) and the resulting solution was heated for 1 hour to 100°C. Thereafter the solution was introduced with cooling to 20°C into a solution of 110 g of sodium hydroxide in 600 ml. of water. The bis-oxazoline which precipitated was isolated, washed and dried as in Example 2. 1,4-bis-(Δ2-oxazolinyl-2)-benzene was obtained in a yield of 30 g (70% of the theoretical yield), melting point 247°C.

EXAMPLE 4

100 g of isophthalic acid-bis-N-(2-hydroxyethyl)-amide were dissolved at 30 to 100°C in 210 g of 30% oleum (30% of SO₃, 70% of H₂SO₄). The mixture was heated for 2 hours to 100°C and then introduced with cooling into a solution of 200 g of sodium hydroxide in 1000 ml of water. The bis-oxazoline which precipitated was isolated, washed and dried as in Example 3. 1,3-bis-(Δ²-oxazolinyl-2)-benzene was obtained in a yield of 68 g (79% of the theoretical yield), melting point 143°C.

EXAMPLE 5

100 g of phthalic acid-bis-N-(2-hydroxyethyl)-amide were dissolved at 60-80°C in 210 g of 30% oleum (30% of SO₃, 70% of H₂SO₄). After the solution had been heated for 2 hours to 90°C, it was added dropwise to a mixture of a solution of 200 g of sodium hydroxide in 1 liter of water and 500 ml. of chlorobenzene with vigorous stirring and cooling. The organic phase was separated off, dried with zeolite and concentrated by evaporation in a vacuum rotary evaporator. 1,2-bis-($\Delta^2$-oxazolinyl-2)-benzene was obtained in a yield of 44.5 g (52% of the thereotical yield), melting point 106°C.

EXAMPLE 6

148 g of trimellitic acid-tris-N-(2-hydroxyethyl)-amide were introduced at 30°–70°C into 420 g of 30% oleum (30% of $SO_3$, 70% of $H_2SO_4$), after which the solution was heated for 2 hours to 100°C and then poured into a mixture cooled to 30°–40°C of a solution of 400 g of sodium hydroxide in 2 liters of water and of 600 ml. of methylene chloride. The phases were subsequently separated. The organic phase was dried with zeolite and concentrated by evaporation to dryness. 1,2,4-tris-($\Delta^2$-oxazoline-2)-benzene was obtained in a yield of 68.5 g (55% of the theoretical yield), melting point 153°C.

EXAMPLE 7

50 g of 4-methylbenzoic acid-N-2-hydroxyethylamide were introduced with stirring at 60° to 100°C into 130 g of 96% sulphuric acid. The solution was heated for 1 hour to 100°C and then added dropwise with stirring and cooling at 20°C to a mixture of 120 g of sodium hydroxide, dissolved in 500 ml of water, and 500 ml. of chlorobenzene. After phase separation, the aqueous phase was extracted twice with 300 ml. of chlorobenzene. The combined organic phases were concentrated in vacuo to dryness. 2-(4-methylphenyl)-$\Delta^2$-oxazoline was obtained in a yield of 35 g (78% of the theoretical yield), melting point 68°C.

EXAMPLE 8

270 g of sebacic acid-bis-N-2-hydroxyethylamide were dissolved at 40°–90°C in 520 g of 30% oleum and the resulting solution was heated for 2 hours to 100°C. The solution was then added dropwise at 0°C to a stirred mixture of 480 g of NaOH in 2000 ml. of water and 1 liter of chlorobenzene. After separation, the aqueous phase was extracted three times with 1000 ml. of butanol. The combined organic phases were concentrated in vacuo. Bis-($\Delta^2$-oxazolinyl-2)-octane was obtained in a yield of 100 g (47% of the theoretical yield), melting point 53°–55°C.

EXAMPLE 9

50 g of phenylacetic acid-N-2-hydroxyethylamide were introduced with stirring at 60°C into 130 g of 96% sulphuric acid and the mixture was subsequently heated to 100°C. The solution was then added dropwise with stirring to a mixture of sodium hydroxide (120 g of NaOH in 500 ml. of water) and 250 ml. of chlorobenzene, the temperature being maintained by cooling at 20°C. The organic phase was then separated off and subjected to fractional distillation. 2-benzene$\Delta^2$-oxazoline was obtained in a yield of 31 g (approximately 70% of the theoretical yield), boiling point (0.1 Torr) 78° to 79°C.

EXAMPLE 10

100 g of salicylic acid-N-2-hydroxyethylamide were introduced at 50° to 80°C into 550 g of 96°% sulphuric acid. The resulting solution was maintained for 2 hours at 100°C and then added dropwise with stirring to a mixture of 2 liters of concentrated aqueous ammonia solution and 500 ml. of chlorobenzene, the temperature of the mixture being kept by cooling at 20° to 30°C. After phase separation, the aqueous phase was extracted 5 times with 5 × 500 ml. of chlorobenzene. The combined organic phases were then subjected to fractional distillation, giving 65 g (approximately 70% of the theoretical) of 2-(2-hydroxyphenyl)-$\Delta^2$-oxazoline (boiling point/0.15 Torr: 98°C.).

EXAMPLE 11

160 g of 5-aminoisophthalic acid-bis-N-2-hydroxyethylamide were introduced with heating to 100°C into 450 g of 30% oleum and the mixture was maintained at this temperature for 2 hours. Thereafter the solution was added dropwise to sodium hydroxide (400 g of NaOH in 2 liters of water), the temperature being maintained by cooling at 20° to 30°C. The mixture was then heated to 70°C and the deposit which precipitated was filtered under suction. Bis-($\Delta^2$-oxazolinyl-2)-5-aminobenzene was obtained in a yield of 90 g (approximately 60% of the theoretical yield), m.p. 212°–214°C.

EXAMPLE 12

230 g of 4-aminobenzoic acid-N-2-hydroxyethylamide were fused and introduced at 80°–100°C into 700 g of 96% sulphuric acid. The mixture was heated for 2 hours to 100°C and subsequently introduced with cooling at 20°C into sodium hydroxide (580 g of NaOH in 2.5 liters of water). The deposit was then filtered under suction, giving 125 g (approximately 60% of the theoretical yield) of 2-(4-aminophenyl)-$\Delta^2$-oxazoline, melting point: 160°C.

EXAMPLE 13

56 g of ω-aminocaproic acid-N-2-hydroxyethylamine were dissolved while stirring 120 g of 20% oleum and the solution was heated for 2 hours to 100°C. The solution was then added dropwise to sodium hydroxide (130 g of NaOH in 400 ml. of water) with stirring and cooling at 20°C. The aqueous solution was extracted 4 times with 4 × 250 ml. of isobutanol. Fractional distillation of the organic phase gave 37 g (74% of the theoretical yield) of 2-(ω-aminopentamethylene)-$\Delta^2$-oxazoline (boiling point/0.05 Torr: 70° to 75°C.

What is claimed is:

1. Process for preparing for 2-substituted $\Delta^2$-oxazolines unsubstituted in the 4- and 5-positions which comprises reacting an N-(2-hydroxyethyl)-carboxylic acid amide having the formula:

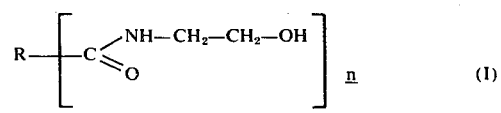

wherein
 n is 2 or 3; and
 R is an aromatic radical selected from the group of phenyl, naphthyl, anthranyl and phenanthrenyl and the foregoing substituted with a substituent selected from the group of halogen, hydroxy, nitro, alkyl with 1-8 carbon atoms, alkoxy having from 1–8 carbon atoms, alkyl-carbonyl having 1–8 carbon atoms in the alkyl portion and alkoxy-carbonyl having 1–8 carbon atoms in the alkyl portion and the radical —NHR' where R' is hydrogen, alkyl having 1-18 carbon atoms or phenyl with oleum at a temperature in the range of from 50°C to 150°C, and thereafter neutralizing the resulting reaction mixture.

2. Process of claim 1, wherein the reaction is carried out at a temperature of from 70°C to 120°C.

3. Process of claim 1 wherein said oleum is 40–65% oleum.

4. Process of claim 1 wherein R is phenyl or naphthyl.

5. Process of claim 4 wherein R is phenyl.

6. Process of claim 1 wherein the neutralization is carried out by addition of a base with cooling to a temperature of from 5°C to 100°C.

7. Process of claim 1 wherein said oleum is 20–30% oleum.

* * * * *